(12) United States Patent
Olsson et al.

(10) Patent No.: US 8,979,060 B1
(45) Date of Patent: Mar. 17, 2015

(54) DEVICE HOLDER FOR RETAINING AN ELECTRONIC DEVICE

(71) Applicant: Google Inc., Mountain View, CA (US)

(72) Inventors: Maj Isabelle Olsson, San Francisco, CA (US); Ian Rickard Muldoon, Redwood City, CA (US); Jason Holt, Mountain View, CA (US); Matthew Wyatt Martin, Ross, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/747,590

(22) Filed: Jan. 23, 2013

(51) Int. Cl.
*F16M 13/00* (2006.01)

(52) U.S. Cl.
CPC .................................. *F16M 13/005* (2013.01)
USPC ..................... 248/634; 248/309.1; 248/311.2; 248/682; 379/455

(58) Field of Classification Search
USPC ........ 248/634, 309.1, 311.2, 312.1, 310, 682, 248/686, 687, 560, 127, 346.03, 346.04, 248/694, 903; 297/188.04, 248, 188.06, 297/188.11, 188.12, 188.2; 379/455; 211/32; 224/411, 926
See application file for complete search history.

(56) References Cited

U.S. PATENT DOCUMENTS

| | | | | |
|---|---|---|---|---|
| 5,351,868 A * | 10/1994 | Beletsky et al. | ............... | 224/245 |
| 5,526,924 A * | 6/1996 | Klutznick | ........................... | 206/5 |
| 5,627,727 A * | 5/1997 | Aguilera et al. | ......... | 361/679.43 |
| 5,687,874 A * | 11/1997 | Omori et al. | ................... | 220/737 |
| 5,708,707 A * | 1/1998 | Halttunen et al. | ............ | 379/446 |
| 6,029,871 A * | 2/2000 | Park | ............................... | 224/197 |
| 6,045,017 A * | 4/2000 | Connell | ..................... | 224/148.7 |
| 6,084,963 A * | 7/2000 | Hirai et al. | ..................... | 379/446 |
| 6,176,401 B1 * | 1/2001 | Lim | .............................. | 224/196 |
| 6,311,881 B1 * | 11/2001 | Kamiya | ........................ | 224/195 |
| 6,341,218 B1 * | 1/2002 | Poplawsky et al. | ........ | 455/569.1 |
| 6,367,672 B1 * | 4/2002 | Lind | ............................. | 224/245 |
| 6,543,637 B1 * | 4/2003 | Osborn | ......................... | 220/737 |
| 6,742,685 B2 | 6/2004 | Williams | | |
| 7,040,590 B2 * | 5/2006 | Carnevali | ................... | 248/311.2 |
| 7,194,087 B2 * | 3/2007 | Luginbill et al. | ............. | 379/455 |
| 7,480,138 B2 * | 1/2009 | Kogan et al. | ............. | 361/679.02 |
| 7,597,301 B2 * | 10/2009 | Seil et al. | .................... | 248/311.2 |
| 7,889,498 B2 * | 2/2011 | Diebel et al. | ............. | 361/679.56 |
| 8,430,240 B2 * | 4/2013 | Kim | ............................... | 206/320 |
| 2003/0064751 A1 * | 4/2003 | Charlier et al. | ............... | 455/557 |
| 2004/0086112 A1 * | 5/2004 | Hilger et al. | ................... | 379/455 |

(Continued)

FOREIGN PATENT DOCUMENTS

EP    2 230 770    9/2010

*Primary Examiner* — Monica Millner
(74) *Attorney, Agent, or Firm* — Dority & Manning, P.A.

(57) ABSTRACT

A device holder for retaining an electronic device is disclosed. The device holder may generally include an inner member and an outer member. The inner member may include a back wall and first and second inner sidewalls extending from the back wall so as to define an inner slot configured to receive at least a portion of the electronic device. The outer member may be configured to receive at least a portion of the inner member and may include a first outer sidewall configured to be disposed adjacent to the first inner sidewall and a second outer sidewall configured to be disposed adjacent to the second inner sidewall. When the electronic device is received within the inner slot, at least a portion of the first inner sidewall may be configured to be deformed between the electronic device and the first outer sidewall and at least a portion second inner sidewall may be configured to be deformed between the electronic device and the second outer sidewall.

20 Claims, 2 Drawing Sheets

(56) References Cited

U.S. PATENT DOCUMENTS

2007/0015547 A1    1/2007  Grier
2008/0007214 A1*   1/2008  Cheng ........................ 320/114
2012/0018325 A1*   1/2012  Kim .............................. 206/320
2012/0275127 A1*   11/2012 Liu ............................... 361/759
2013/0026314 A1*   1/2013  Hu et al. ...................... 248/157

\* cited by examiner

DEVICE HOLDER FOR RETAINING AN ELECTRONIC DEVICE

FIELD

The present subject matter relates generally to electronic devices, such as mobile phones and tablet computers, and, more particularly, to a device holder for retaining such devices.

BACKGROUND

Various device holders have been developed for retaining electronic devices, particularly with respect to mobile phones. Typically, the configuration of a conventional mobile phone holder is designed based on the size and shape of the specific mobile phone to be retained within the holder. Thus, numerous mobile phone holders of different sizes and shapes must be designed and manufactured to accommodate the various different types and models of mobiles phone present in the marketplace.

To address such issue, mobile phone holders have been developed with adjustable dimensions that allow such holders to accommodate mobile phones of different sizes and shapes. However, such holders typically require one or more specific adjustment mechanisms that must be physically manipulated to adjust the dimensions of the holder to match the dimensions of the mobile phone being retained. As a result, these phone holders are relatively expensive to manufacture and are often difficult to use.

SUMMARY

Aspects and advantages of the invention will be set forth in part in the following description, or may be obvious from the description, or may be learned through practice of the invention.

In one aspect, the present subject matter is directed to a device holder for retaining an electronic device. The device holder may generally include an inner member and an outer member. The inner member may include a back wall and first and second inner sidewalls extending from the back wall so as to define an inner slot configured to receive at least a portion of the electronic device. The outer member may be configured to receive at least a portion of the inner member and may include a first outer sidewall configured to be disposed adjacent to the first inner sidewall and a second outer sidewall configured to be disposed adjacent to the second inner sidewall. When the electronic device is received within the inner slot, at least a portion of the first inner sidewall may be configured to be deformed between the electronic device and the first outer sidewall and at least a portion of the second inner sidewall may be configured to be deformed between the electronic device and the second outer sidewall.

In another aspect, the present subject matter is directed to a device holder for retaining an electronic device. The device holder may include an inner member and an outer member. The inner member may be formed at least partially from a resilient material. In addition, the inner member may include a back wall and first and second inner sidewalls extending from the back wall so as to define an inner slot configured to receive at least a portion the electronic device. The outer member may include a back wall and first and second outer sidewalls extending from the back wall so as to define an outer slot configured to receive at least a portion of the inner member.

In a further aspect, the present subject matter is directed to a device holder for retaining an electronic device. The device holder may generally include an inner member and an outer member. The inner member may include a back wall and first and second inner sidewalls extending from the back wall so as to define an inner slot configured to receive at least a portion of the electronic device. The outer member may be configured to receive at least a portion of the inner member and may include a first outer sidewall configured to be disposed adjacent to the first inner sidewall and a second outer sidewall configured to be disposed adjacent to the second inner sidewall. When the electronic device is received within the inner slot, at least a portion of the first inner sidewall may be configured to be deformed into a first cavity defined between the electronic device and the first outer sidewall and at least a portion of the second inner sidewall may be configured to be deformed into a second cavity defined between the electronic device and the second outer sidewall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
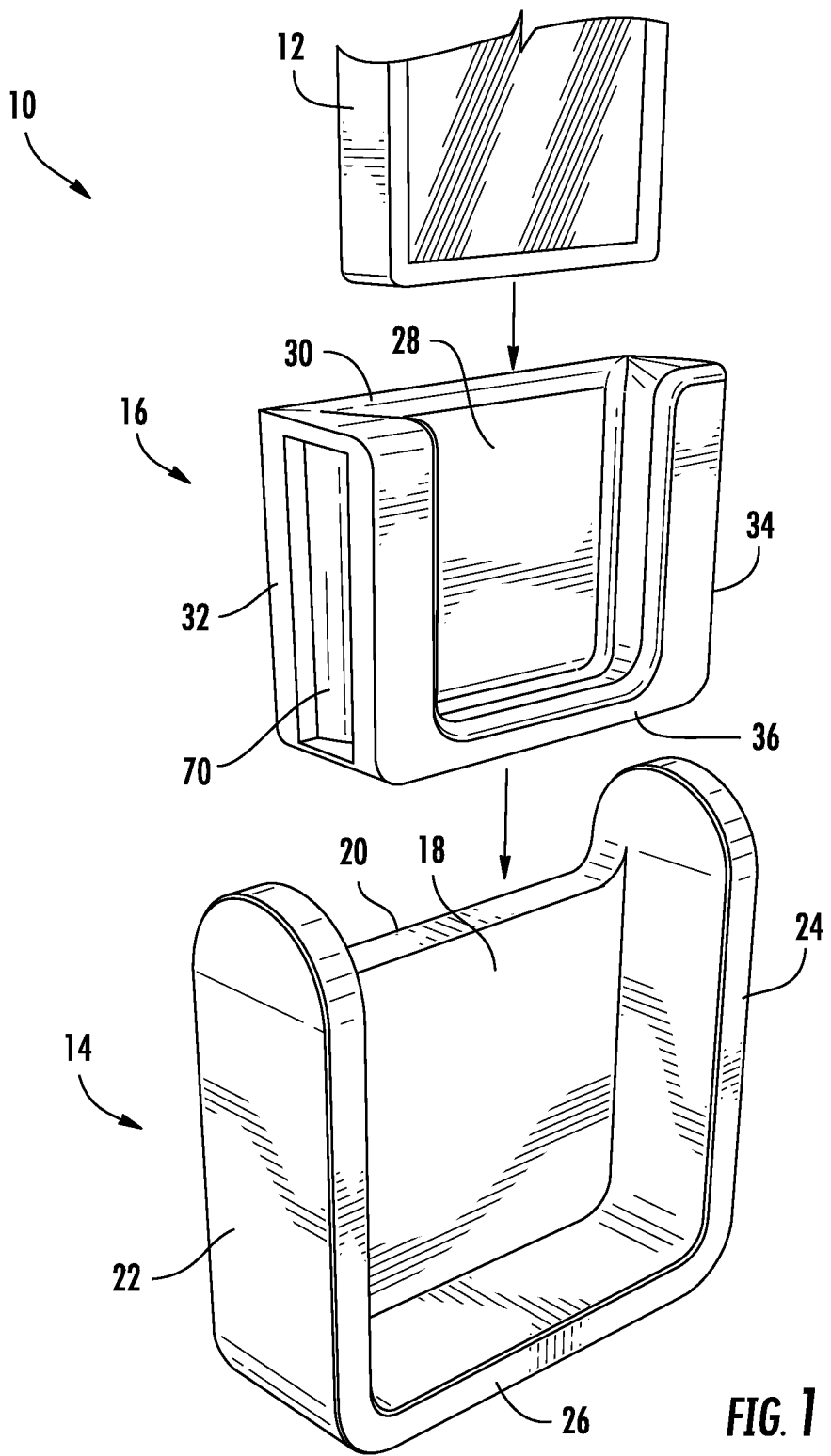
FIG. 1 illustrates an exploded, perspective view of one embodiment of a device holder for retaining an electronic device in accordance with aspects of the present subject matter.
Figure 2:
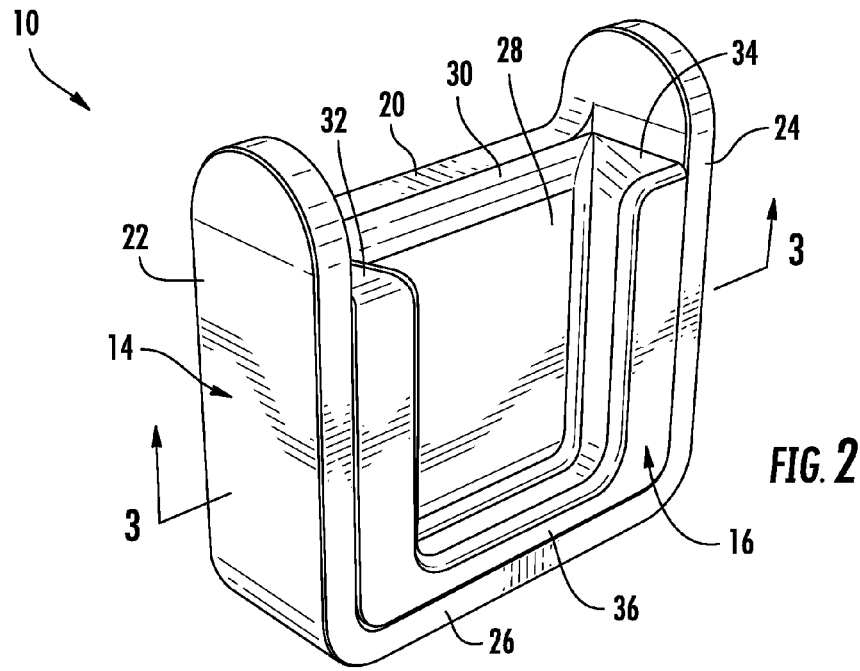
FIG. 2 illustrates an assembled, perspective view of the device holder shown in FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a device holder for retaining electronic devices, such as mobile phones and/or tablet computers. Specifically, the device holder may include an outer member and an inner member configured to be received within the outer member. The inner member may be formed from a resilient material (e.g., silicone rubber) that allows the inner member to be compressed or otherwise deformed. Thus, in several embodiments, at least a portion of the inner member may be configured to be deformed relative to the outer member when an electronic device is inserted into the holder, with the amount of deformation of the inner member varying based on the dimensions of the electronic device. As such, the device holder may be configured to accommodate electronic devices of varying sizes and shapes.

Referring now to the drawings, FIGS. 1-4 illustrate one embodiment of a device holder 10 for retaining an electronic device 12 in accordance with aspects of the present subject matter. As shown, the device holder 10 may generally include an outer member 14 and an inner member 16. The outer member 14 may define an outer slot 18 configured to at least partially receive the inner member 16. For example, as shown in FIG. 1, the outer member 14 may include a back wall 20, a first outer sidewall 22, a second outer sidewall 24 and a bottom wall 26, with the outer sidewalls 22, 24 and the bottom wall 26 extending from the back wall 20 so as to define an open-ended, outwardly facing slot 18. Thus, when the device 10 is assembled, the inner member 16 may be received within the outer slot 18 such that the outer member 14 at least partially surrounds and/or retains the inner member 16.

It should be appreciated that the outer member 14 may generally be formed from any suitable material. For example, in several embodiments, the outer member 14 may be formed from a rigid or a semi-rigid material, such as a rigid or semi-rigid plastic material or a metal material (e.g. aluminum). It should also be appreciated that both the dimensions and shape of the outer slot 18 may generally be selected based on the dimensions and/or shape of the inner member 16. For example, as shown in FIG. 1, the outer slot 18 defines a rectangular shape generally corresponding to the rectangular-shaped footprint of the inner member 16. However, in other embodiments, the outer slot 18 may be configured to define any other suitable shape that permits at least a portion of the inner member 16 to be received within the slot 18.

Additionally, it should be appreciated that the inner member 16 may be configured to be retained within the slot 18 using any suitable means. For example, in one embodiment, the inner member 16 may simply be retained within the slot 18 via the frictional interface created between the inner and outer members 16, 14. In another embodiment, the inner member 16 may be secured within the outer slot 18 using a suitable adhesive. In a further embodiment, mechanical fasteners, mating features and/or any other suitable attachment means may be utilized to secure the inner member 16 within the outer slot 18.

The inner member 16 of the disclosed holder 10 may generally be configured to define an inner slot 28 configured to at least partially receive the electronic device 12 being retained within the holder 10. For example, as shown in the illustrated embodiment, the inner member 16 may include a back wall 30, a first inner sidewall 32, a second inner sidewall 34 and a bottom wall 36, with the inner sidewalls 32, 34 and the bottom wall 36 extending from the back wall 30 so as to define an open-ended, outwardly facing slot 28. Thus, during use of the disclosed holder 10, the electronic device 12 may be received within the inner slot 28 such that the inner member 16 at least partially surrounds and retains the electronic device 12 within the holder 10.

Figure 3:
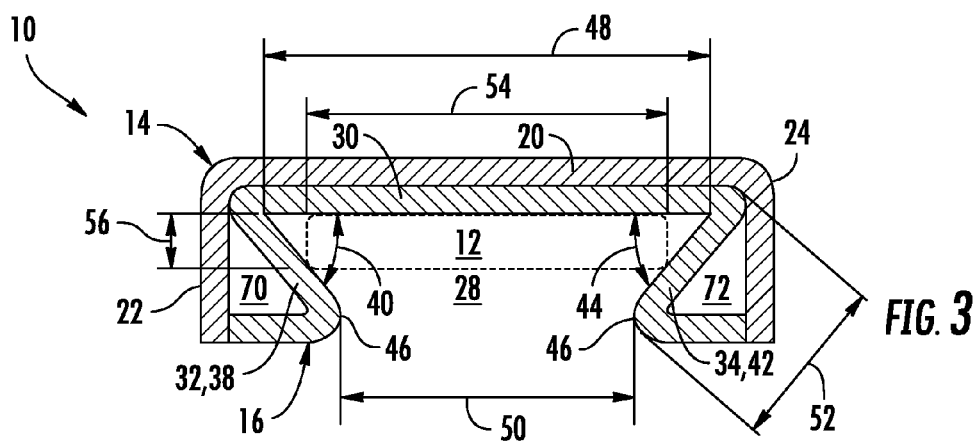
FIG. 3 illustrates a cross-sectional view of the device holder shown in FIG. 2 taken about line 2-2.

In several embodiments, at least a portion of each of the inner sidewalls 32, 34 may be configured to extend from the back wall 30 at an angle. For example, as shown in FIG. 3, a first angled portion 38 of the first inner sidewall 32 may be configured to extend inwardly from the back wall 30 so that a first acute angle 40 is defined between the inner sidewall 32 and the back wall 30 and a second angled portion 42 of the second inner sidewall 34 may be configured to extend inwardly from the back wall 30 so that a second acute angle 44 is defined between the inner sidewall 34 and the back wall 30. As such, the inner slot 28 defined between the first and second inner sidewalls 32, 34 may generally converge as the inner sidewalls 32, 34 extend from the back wall 30 to an open end 46 of the slot 28. Specifically, as shown in FIG. 3, the inner sidewalls 32, 34 may be angled inwardly from the back wall 30 such that a width 48 of the inner slot 28 at the back wall 30 is greater than a width 50 of the slot 28 at its open end 46, thereby defining a dovetail-like shape.

Additionally, as particularly shown FIGS. 1 and 3, at least a portion of the outer surface of the first and second outer sidewalls 32, 34 may be recessed inwardly such that open volumes or cavities 70, 72 are defined between the inner sidewalls 32, 34 and the outer sidewalls 22, 24 when the inner member 16 is received within the outer member 14. For example, as shown in FIG. 3, a first cavity 70 may be defined between the first inner sidewall 32 and the first outer sidewall 22. Similarly, a second cavity 72 may be defined between the second inner sidewall 34 and the second outer sidewall 24. As will be described below, such cavities 70, 72 may permit the inner sidewalls 32, 34 to be deformed relative to the outer sidewalls 22, 24, thereby allowing the device holder 10 to accommodate devices 12 of varying sizes and shapes.

It should be appreciated that, in several embodiments, the angle 40, 44 defined between each inner sidewall 32, 34 and the back wall 30, as well as a length 52 of each angled portion 38, 42, may be selected based on the dimensions of the smallest electronic device 12 that is to be retained within the device holder 10. Specifically, in one embodiment, the angles 40, 44 and/or lengths 52 may be selected based on a minimum width 54 and/or a minimum depth 56 of the smallest electronic device 12. Thus, when an electronic device 12 defining such minimum width 54 and/or minimum depth 54 is inserted into the inner slot 28, the device 12 may be retained within the inner slot 28 between the back wall 30 and the inner sidewalls 32, 34.

Figure 4:
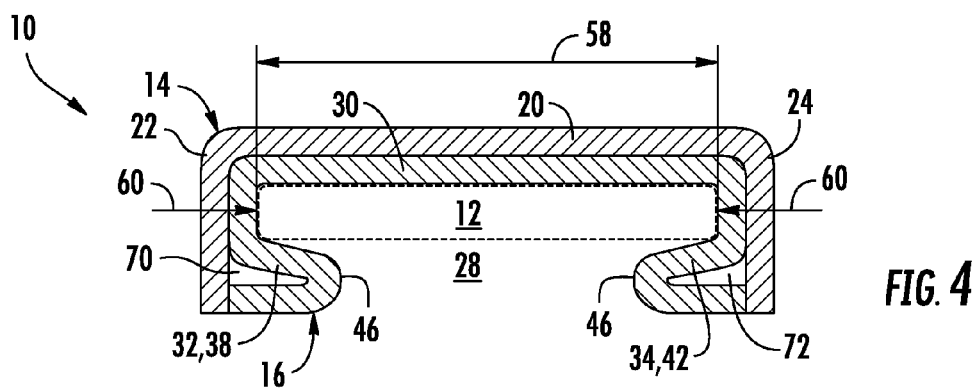
FIG. 4 illustrates another cross-sectional view of the device holder shown in FIG. 3, particularly illustrating sidewalls of an inner member of the device holder being deformed.

Additionally, in several embodiments, the inner member 16 may be formed from a flexible or resilient material, such as silicone rubber, other rubber materials, or any other suitable flexible/resilient material. As such, the inner sidewalls 32, 34 of the inner member 16 may be configured to be deformed into the open spaces or cavities 70, 72 when an electronic device 12 is inserted into the inner slot 28 that defines a width and/or a depth that is larger than the minimum width 54 and/or the minimum depth 56 for which the device holder 10 has been designed. For example, FIG. 4 illustrates a cross-sectional view of the disclosed holder after an electronic device 12 has been inserted into the inner slot 28 that defines a width 58 that is greater than the minimum width 54. As shown, due to the width 58 of the device 12, the resilient inner sidewalls 32, 34 may be deformed between the electronic device 12 and the outer sidewalls 22, 24 of the outer member 14. Such deformation of the inner sidewalls 32, 34 may generate a reactive force (indicated by arrows 60 in FIG. 4) that is applied inwardly against the electronic device 12, thereby retaining the device 12 within the inner slot 28. Moreover, as shown in FIG. 4, such deformation may also cause the portions of the inner sidewalls 32, 34 not positioned directly between the electronic device 12 and the outer sidewalls 22, 24 (i.e., the portions of the inner sidewalls 32, 34 closest to the open end 46 of the slot 28) to deform inwardly, thereby creating a lip or flange around the outer edge of the electronic device 12 that further retains the device 12 within the inner slot 28.

It should be appreciated that, in several embodiments, the width 48 of the inner slot 28 may be selected based on the width (e.g., width 58) of the widest electronic device 10 that is to be retained within the device holder 10. For example, in one embodiment, the width 48 may be equal to or slightly larger than the maximum width to be accommodated. Alternatively, since the thickness of the inner sidewalls 32, 34 may be reduced as the resilient material of the inner member 16 is deformed, the width 48 may be configured to be slightly smaller than the maximum width.

Additionally, it should be appreciated that the components of the disclosed device holder 10 may generally be configured to accommodate any suitable electronic device. For example, in several embodiments, the inner and outer members 14, 16 may be dimensioned so as to allow various different mobile phones to be retained within the holder 10. In other embodiments, the inner and outer members 14, 16 may be dimensioned so as to allow various different tablet computers to be retained within the holder 10. In further embodiments, the inner and outer members 14, 16 may be dimensioned so as to allow any other suitable electronic devices to be retained within the holder 10, such as digital cameras and/or the like.

It should also be appreciated the disclosed holder 10 may be configured as a stand-alone device or may form part of any other suitable device/assembly. Specifically, in several embodiments, the outer member 14 of the holder 10 may be formed integrally with and/or may be separately assembled into any suitable device/assembly that may be associated with an electronic device 12. For example, the outer member 14 may form all or part of a base configured for supporting the electronic device 12 within a vehicle (e.g., to mount the electronic device to the dashboard) or relative to any suitable surface. Specifically, in one embodiment, the outer member 14 may be configured to be coupled to a suitable frame for positioning the electronic device 12 relative to a given location (e.g., in front of a user of the device or adjacent to an object being imaged using the device 12). In another embodiment, the outer member 14 may form all or part of a base or frame configured to be clipped to a user's belt or otherwise secured to any other suitable object.

Additionally, it should be appreciated that, although the present subject matter has been described herein as including an inner member 16 having first and second resilient sidewalls 32, 34, the inner member 16 may be configured to only include a single resilient sidewall. For example, in one embodiment, one of the sidewalls 32, 34 may be formed from a resilient material while the other sidewall 32, 34 may be formed from a rigid material.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A device holder for retaining an electronic device, the device holder comprising:

an outer member including a first outer sidewall and a second outer sidewall spaced apart from the first outer sidewall such that an outer slot is defined between the first and second outer sidewalls, the first and second sidewalls being formed from a rigid or semi-rigid material; and an inner member extending within the outer slot, the inner member including a back wall and first and second sidewalls extending from the back wall so as to define an inner slot, the first inner sidewall being positioned adjacent to the first outer sidewall and the second inner sidewall being positioned adjacent to the second outer sidewall, the first and second inner sidewalls being formed substantially entirely from a resilient material such that the first and second inner sidewalls deform relative to the first and second outer sidewalls when the electronic device is positioned within the inner slot, wherein a portion of the first inner sidewall contacts a portion of the first outer sidewall and wherein a portion of the second inner sidewall contacts a portion of the second outer sidewall, wherein at least a portion of an outer surface of each of the first and second inner sidewalls is recessed such that a first cavity is defined between the first inner sidewall and the first outer sidewall and a second cavity is defined between the second inner sidewall and the second outer sidewall.

2. The device holder of claim 1, wherein at least a portion the first and second inner sidewalk extend from the back wall at an angle.

3. The device holder of claim 2, wherein each of the first and second inner sidewalls extend from the back wall to an open end of the inner slot, the first and second inner sidewalls being angled inwardly from the back wall such that a width of the inner slot at the back wall is greater than a width of the slot at the open end.

4. The device holder of claim 2, wherein at least one of the angle and a length of the angled portion of each of the first and second inner sidewalk is selected based on at least one of a minimum width or a minimum depth of the electronic device.

5. The device holder of claim 1, wherein the deformation of the first and second inner sidewalls generates a reactive force that retains the electronic device within the slot.

6. The device holder of claim 1, wherein the resilient material comprises silicone rubber.

7. The device holder of claim 1, wherein a width of the inner slot at the hack wall of the inner member is selected based on a maximum width of the electronic device.

8. The device holder of claim 1, wherein the outer member includes a back wall, the first and second outer sidewalk extending from the hack wall so as to define the outer slot.

9. A device holder for retaining an electronic device, the device holder comprising:

an outer member including a first outer sidewall and a second outer sidewall spaced apart from the first outer sidewall such that an outer slot is defined between the first and second outer sidewalk, the first and second sidewalls being formed from a rigid or semi-rigid material; and an inner member extending within the outer slot, the inner member including a hack wall and first and second sidewalls extending from the back wall so as to define an inner slot, the first inner sidewall being positioned adjacent to the first outer sidewall and the second inner sidewall being positioned adjacent to the second outer sidewall, the first and second inner sidewalls being formed substantially entirely from a resilient material such that, when the electronic device is positioned within the inner slot, the first inner sidewall deforms into a first cavity defined between the first inner sidewall and the first outer sidewall and the second inner sidewall deforms into a second cavity defined between the second inner sidewall and the second outer sidewall.

10. The device holder of claim 9, wherein an outer surface of each of the first and second inner sidewalls is recessed such that the first cavity is defined by at least a portion of the first inner sidewall and the second cavity is defined by at least a portion of the second inner sidewall.

11. The device holder of claim 9, wherein each of the first and second inner sidewalls extend from the back wall to an open end of the inner slot, the first and second inner sidewalls being angled inwardly from the back wall such that a width of the inner slot at the back wall is greater than a width of the slot at the open end.

12. A device holder for retaining an electronic device, the device holder comprising:
    an outer member including a hack wall and first and second outer sidewalls extending from the back wall so as to define an outer slot,
    an inner member formed substantially entirely from a resilient material such that the inner member is deformable relative to the outer member and extending within the outer slot, the inner member including a back wall and first and second inner sidewalls extending from the back wall so as to define an inner slot for receiving at least a portion the electronic device,
    wherein a portion of the first inner sidewall contacts a portion of the first outer sidewall and wherein a portion of the second inner sidewall contacts a portion of the second outer sidewall,
    wherein at least a portion of an outer surface of each of the first and second inner sidewalls is recessed such that a first cavity is defined between the first inner sidewall, and the first outer sidewall and a second cavity is defined between the second inner sidewall and the second outer sidewall.

13. The device holder of claim 12, wherein at least a portion the first and second inner sidewalls extend from the back wall at an angle.

14. The device holder of claim 13, wherein each of the first and second inner sidewalls extend from the back wall to an open end of the inner slot, the first and second inner sidewalls being angled inwardly from the back wall such that a width of the inner slot at the back wall is greater than a width of the slot at the open end.

15. The device holder of claim 14, wherein the resilient material comprises silicone rubber.

16. The device holder of claim 12, wherein, when the electronic device is received within the inner slot, at least a portion of the first inner sidewall deforms between the electronic device and the first outer sidewall and at least a portion second inner sidewall deforms between the electronic device and the second outer sidewall.

17. The device holder of claim 16, wherein the deformation of the first and second inner sidewalls generates a reactive force that retains the electronic device within the slot.

18. The device holder of claim 9, wherein the deformation of the first and second inner sidewalls generates a reactive force that retains the electronic device within the slot.

19. The device holder of claim 9, wherein a width of the inner slot at the back wall of the inner member is selected based on a maximum width of the electronic device.

20. The device holder of claim 11, wherein at least one of an angle and a length of the angled portion of each of the first and second inner sidewalls is selected based on at least one of a minimum width or a minimum depth of the electronic device.

\* \* \* \* \*